United States Patent
Nelson et al.

(10) Patent No.: US 10,583,993 B2
(45) Date of Patent: Mar. 10, 2020

(54) CONVEYOR LEVELING SYSTEMS AND METHODS

(71) Applicant: Superior Industries, Inc., Morris, MN (US)

(72) Inventors: Brett Nelson, Hancock, MN (US); Scott Oberg, New London, MN (US); Steven Haugen, Florissant, MN (US); Bryan Weiss, Ham Lake, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/414,151

(22) Filed: May 16, 2019

(65) Prior Publication Data

US 2019/0270597 A1 Sep. 5, 2019

Related U.S. Application Data

(63) Continuation of application No. 15/233,629, filed on Aug. 10, 2016, now Pat. No. 10,315,853.

(60) Provisional application No. 62/311,515, filed on Mar. 22, 2016, provisional application No. 62/203,222, filed on Aug. 10, 2015.

(51) Int. Cl.
*B65G 41/00* (2006.01)

(52) U.S. Cl.
CPC ................................. *B65G 41/008* (2013.01)

(58) Field of Classification Search
CPC ...................................................... B65G 41/00
See application file for complete search history.

(56) References Cited

U.S. PATENT DOCUMENTS 4,206,840 A 6/1980 Hanson
5,833,043 A 11/1998 Schmidgall et al.

FOREIGN PATENT DOCUMENTS

JP S60242115 12/1985

*Primary Examiner* — Gene O Crawford
*Assistant Examiner* — Lester Rushin, III
(74) *Attorney, Agent, or Firm* — Dicke, Billig & Czaja, PLLC

(57) ABSTRACT

Systems and methods for automatically leveling a base frame of a bulk material transport conveyor include raising or lowering either or both radial travel wheels mounted on generally opposing sides of the base frame. Actuators normally used to raise or lower the radial travel wheel actuators may be controlled in response to inclination and/or limit sensors mounted on the conveyor.

20 Claims, 10 Drawing Sheets

CONVEYOR LEVELING SYSTEMS AND METHODS

CROSS REFERENCE TO RELATED APPLICATIONS

This application is a continuation of U.S. patent application Ser. No. 15/233,629, filed Aug. 10, 2016, which claims the benefit of U.S. Provisional Patent Application Ser. No. 62/203,222, filed Aug. 10, 2015, and U.S. Provisional Patent Application Ser. No. 62/311,515, filed Mar. 22, 2016, which are incorporated by reference herein.

TECHNICAL FIELD

This disclosure pertains generally to systems and methods for automatically leveling the moving base frame of a bulk material conveyor transport system.

BACKGROUND

Conveyor systems, particularly radial travel stacking conveyors include wheels mounted on an axle that allow the conveyor to pivot about a pivot point. In operation, such conveyors may become unstable or imbalanced as the wheels encounter un-level ground conditions.

Thus there is a need in the art for conveyor leveling systems and methods for improving, inter alia, stability or balance of a conveyor.

DETAILED DESCRIPTION

In the following description, references to particular equipment or types of equipment should be understood as illustrative but not limiting. For example, references to a programmable logic controller or PLC should be understood as including any form of computerized or electronic equipment capable of performing as described.

Figure 7:
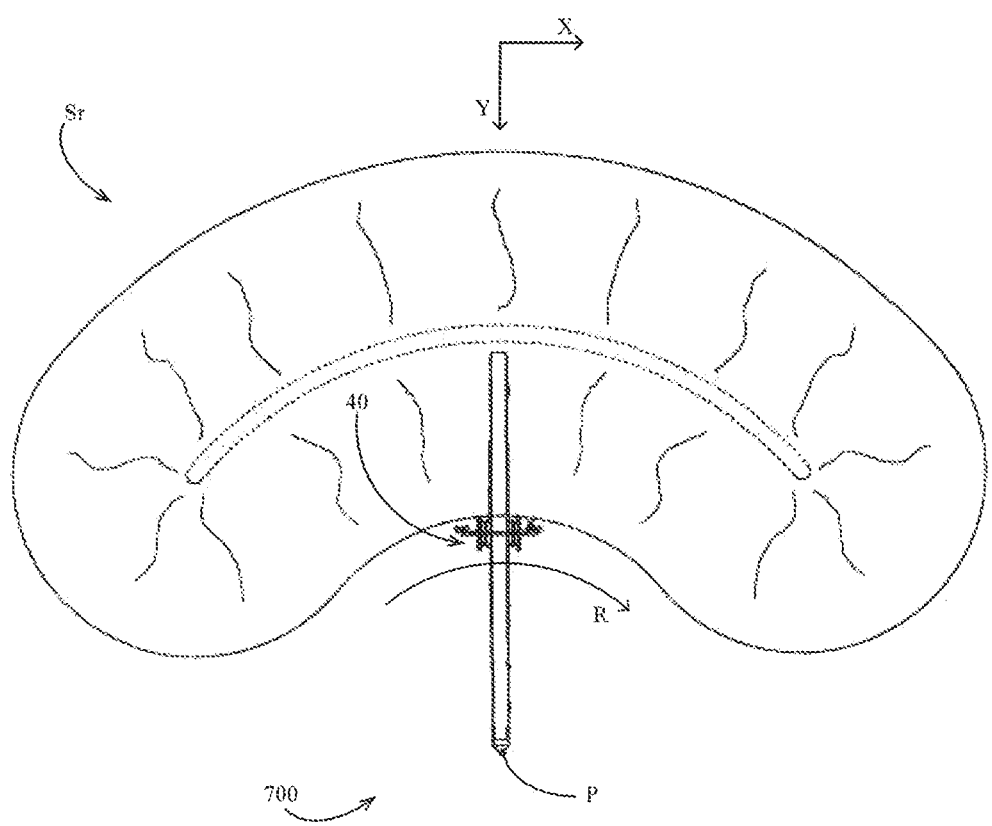
FIG. 7 is a plan view of an embodiment of a conveyor having radial travel wheels.

Bulk material conveyor transport systems are used in stockpiling rock, grain, and/or other aggregate material. In general, such conveyor systems include a support frame or undercarriage, a conveyor assembly mounted on the support frame at a feed end of the base frame, and a support strut that extends between the base frame and the conveyor assembly. The base frame may include a first set of wheels for moving the conveyor to a work site, and a second set of wheels that permit the conveyor to move radially relative to the feed end of the base frame. One version of a conveyor system with radial travel capabilities is generally described in U.S. Pat. No. 5,515,961 (the entire contents of which is incorporated by reference as if fully set forth here) and available commercially from Superior Industries, Inc. of Morris, Minn. under the tradename TeleStacker®. The TeleStacker® system is an example of what is known as a radial stacking conveyor. Such a system generally comprises a heavy-duty base frame which supports the conveyor assembly, which frame has a first set of axles and wheels for transportation in conventional forward or reverse directions, such as over a highway (i.e., in an X direction such as into or out of the page in FIG. 1A). A portion of the base frame may also include a second set of wheels on either end of a base frame known as radial travel wheels that permit side-to-side movement of the conveyor system (i.e., in a Y direction such as to the left or right in FIG. 1A). It should be appreciated that in some embodiments, the conveyor pivots radially on the radial travel wheels about a rearward pivot point such that the Y direction is generally tangential to the radial movement of the conveyor. FIG. 7 illustrates a plan view of an embodiment of a conveyor 700 supported on base frame 40. The illustrated conveyor 700 travels along a radial path R (about rear pivot P) of the conveyor 700 supported on base frame 40 (e.g., as it creates stockpile Sr). An exemplary direction X is illustrated tangential to the radial path R and transverse to an exemplary direction Y (e.g., along a transport direction of the conveyor 700 in a transport mode). In alternative embodiments, the level measurements and leveling operations described herein are performed on conveyors which travel side-to-side (e.g., to create a transverse stockpile) rather than radially.

In one embodiment, each set of radial travel wheels are carried on an axle mounted on an outrigger-like frame connected on opposite sides of the base frame. In one embodiment, the outrigger-like frames are pivotally connected to the base frame. In this embodiment, the radial travel wheels are brought into engagement with the ground by an actuator, such as a hydraulic cylinder, that pivots the outrigger frame from a raised position to a lowered position to transfer the weight of the conveyor system from the first set of wheels to the radial travel wheels (which may be referred to as "FD" axles and wheels, respectively). The outrigger frames may also be referred to as the "left FD" and "right FD" assemblies. The FD wheels are generally directed in the left and right directions, roughly perpendicular to the direction of the transport wheels. (A minor amount of variation from perpendicular may accommodate the radial motion described further below.) Other means for a set of wheels to move stacking conveyors in a radial direction are also known. The method of leveling disclosed herein is not intended to be limited to one radial stacking conveyor system.

For ease of reference, one embodiment of the leveling system will be described by reference to the TeleStacker® system. Once the conveyor system arrives at the jobsite, each of the FD outrigger frames may be hydraulically lowered ("folded down") to a position which places the separate FD wheels below the transport wheels, thus raising the base frame enough to lift the transport wheels above ground. The base frame may then move radially from side to side on the generally left- and right-directed FD wheels, to vary the location of the discharge end of the conveyor. That is, the wheeled end of the conveyor moves radially back and forth on the FD wheels so that the conveyor belt, supported at a distance above the base frame by a truss, discharges bulk material to form long rows of stacked material. See, for example, U.S. Pat. No. 7,470,101, the entire contents of which are incorporated by reference.

Some systems and methods described herein provide for control (e.g., automation) of the actuation of actuators (e.g., the hydraulic cylinders that control the deployment of each FD assembly) to maintain the base frame level while the base frame traverses uneven terrain or changing grades in its back-and-forth travel. In one embodiment, a level sensor 420 (e.g., inclinations sensor) is mounted on the conveyor, such as on the base frame, and communicates a value indicative of the orientation of base frame 40 relative to level in the Y direction to a computer such as a programmable logic controller (PLC) or the equivalent. Sensor 420 can be mounted on other structures of the conveyor so as to monitor the level status of the base frame. Programming determines which actuator to raise or lower to bring the base frame back toward a level position. Optionally, an additional sensor or sensors may provide inputs to the PLC (or equivalent) to determine other variables such as maximum or minimum cylinder extension limits and ground clearance. The concepts described herein may be embodied as a system, or performed as a method, without loss of generality.

Structure

Figure 1A:
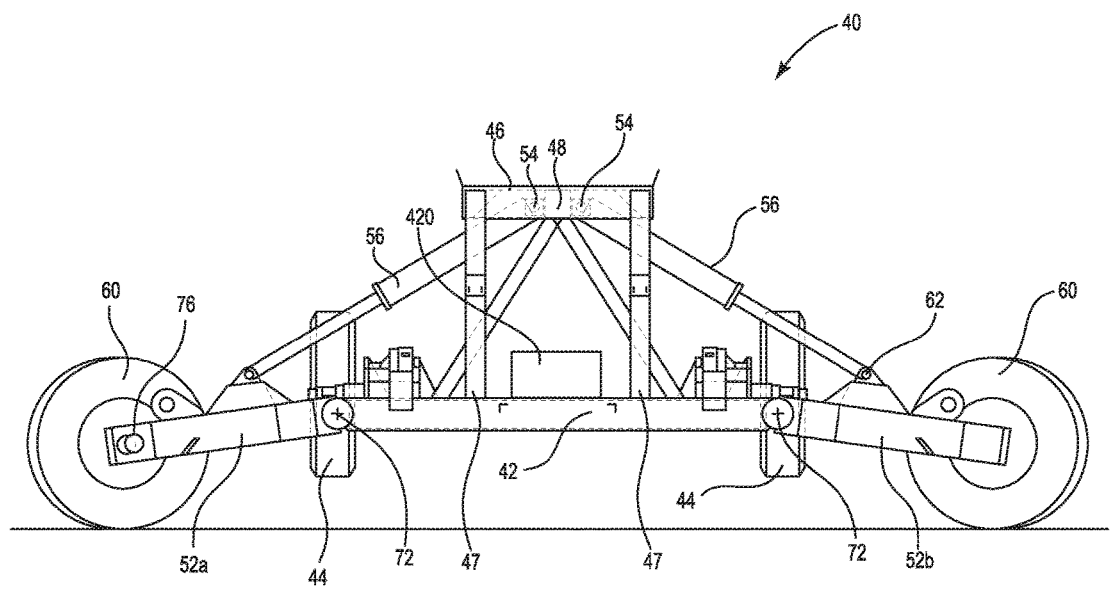
FIGS. 1A and 1B illustrate two positions of a portion of one embodiment of a base frame of a conveyor undercarriage.
Figure 1B:
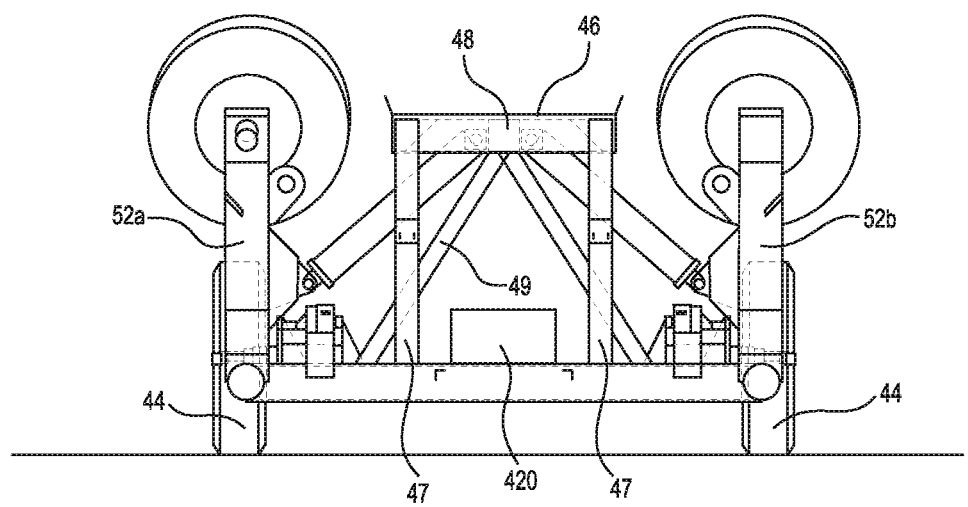

Referring to FIGS. 1A and 1B, which illustrate one embodiment only, a wheeled base frame 40 comprises three main components: a central base frame portion 42, and two frames 52a, 52b (e.g., outrigger-type frames) pivotally mounted on opposing sides of the central base frame portion 42. Each outrigger frame 52a, 52b is preferably wheel-bearing, e.g., supports one or more axles 76 and wheels 60, and in the exemplary embodiment shown, each is pivotably connected to the central base frame portion 42 by a pivotal axis 72 so as to move (e.g., pivot) relative to the central base frame 42. Thus, each outrigger frame 52a, 52b pivots from a transport position, shown in FIG. 1B, in which the central base frame portion 42 is supported on transport wheels 44 and wheels 60 are lifted above the ground, to a radial travel position, shown in FIG. 1A, in which the wheels 60 are lowered to the ground to support the central base frame portion 42 with the transport wheels 44 off of the ground. Conversely, in the radial travel position of FIG. 1A, each outrigger frame is lowered until the wheels 60 are below the level of the central base frame portion 42 by an amount sufficient to lift the base frame, and thus wheels 44, off of the ground, such that the base frame 40 is movable in a radial direction described above. For example, in the radial travel position, in one embodiment the lower surface of the central base frame portion 42 is raised from about 11 inches of clearance above ground to about 22 inches of clearance above ground.

In one embodiment, the base frame includes a support 46 that extends upwardly from the central base frame portion 42. The support 46 may be fabricated from tubular, solid or other structural shapes and configured in a variety of manners although it is preferably equipped with a pair of vertical members 47 each extending upwardly from the central base frame 42, a horizontal cross-member 48 which may support the conveyor assembly (not shown) such as during transport and storage, and angled support reinforcement members 49. Any of these members could be formed from diagonal cross-bracing, curved material, solid gusset plates, or open portions of a structural plate. In various embodiments, the slotted vertical members 47 and/or the reinforcements may be omitted. The central base frame portion 42 is preferably pivotably linked to each of the outrigger frames 52a, 52b by a first pivot such as a support-mounted pin 54, an actuator 56, such as a hydraulic cylinder, and a second pivot such as an outrigger cylinder pin 62 attached to the outer end of the respective outrigger frame. In other conveyor systems that employ a different outrigger-like radial travel arrangement, support 46 may not be utilized. By way of example, in one embodiment a level sensor 420 is mounted on the central base frame portion 42 to monitor the level status of the base frame 40 in the Y direction.

Sequence

A system monitors and adjusts the position of the base frame 40 while the base frame is in the radial travel position to keep base frame 40 level or as close to level as possible in the Y direction. In addition to providing improved stability of the conveyor assembly or truss above the base frame, keeping the base frame level or close to level may improve conveyor belt tracking and alignment issues. It should be appreciated that a level base frame does not guarantee belt alignment. There are several factors that can cause belt misalignment, including idler positioning, head or tail pulley position (angle), material placement on the belt, and belt splice accuracy or belt camber.

In one embodiment, the monitoring and adjustment system controls the actuators 56 to keep the base frame at or near a level orientation in the Y direction. The system is able to adjust the orientation of base frame 40 to level at least to a slope of 5.25% grade (3°). Among other effects, providing a level operating orientation preferably tends to alleviate the effect of non-level truss on belt tracking.

In some embodiments, the transport wheels 44 may contact the ground when the actuators 44 are extended to a first extent less than a maximum extent (e.g., stroke length). For example, FD cylinders may have a 36" stroke length, but the transport wheels may contact the ground at approximately 30" of stroke extension. Thus, in such embodiments, in order to keep the transport wheels off the ground while the base frame is in the radial travel position (e.g., to keep the transport wheels from dragging), a maximum orientation change (e.g., 5.25% or 3 degrees (+/−) clearance) may be available to maintain a level orientation of base frame 40. Depending on the direction of the slope, actuator 56 disposed on the lower side of the base frame 40 is preferably retained in a fully extended position. Full extension of the actuator 56 on the lower side of base frame 40 preferably ensures sufficient (e.g, maximum) clearance for the transport wheels 44 over the grade of the ground being traversed. The actuator 56 disposed on the higher side of the base frame 40 is preferably at least partially retracted (e.g., to lower the base frame relative to the radial wheel 60) to bring the base frame back into a level orientation. In some embodiments, the actuators 56 are only retracted to a partial retraction limit (e.g., retraction of approximately 5" or less) during leveling operations to ensure clearance of the base frame relative to the ground. It should be appreciated that for embodiments of a conveyor system that include transport wheels 44, retraction of the actuators by more than the partial retraction limit may allow one or more transport wheels 44 to drag on the ground (e.g., when negotiating a surface having a slope at or above the maximum orientation change such as 5.25% grade).

Thus, in one embodiment, in order to maintain the base frame above the ground sufficient to prevent the transport wheels from dragging and to optimize (e.g., maximize) the maximum orientation change, a first actuator 56 (e.g., on the low side of the base frame) is fully extended while a second actuator (e.g., on the high side of the base frame) is retracted. If during leveling operations the orientation angle of the base frame crosses the horizontal plane (e.g., changes to an angle having an opposite sign as measured from a horizontal plane), the second actuator (now on the low side of the base frame) preferably extends fully before the first actuator (now on the high side of the base frame) retracts if more correction is required. This result may be accomplished in any manner consistent with the principles disclosed herein.

Figure 2:
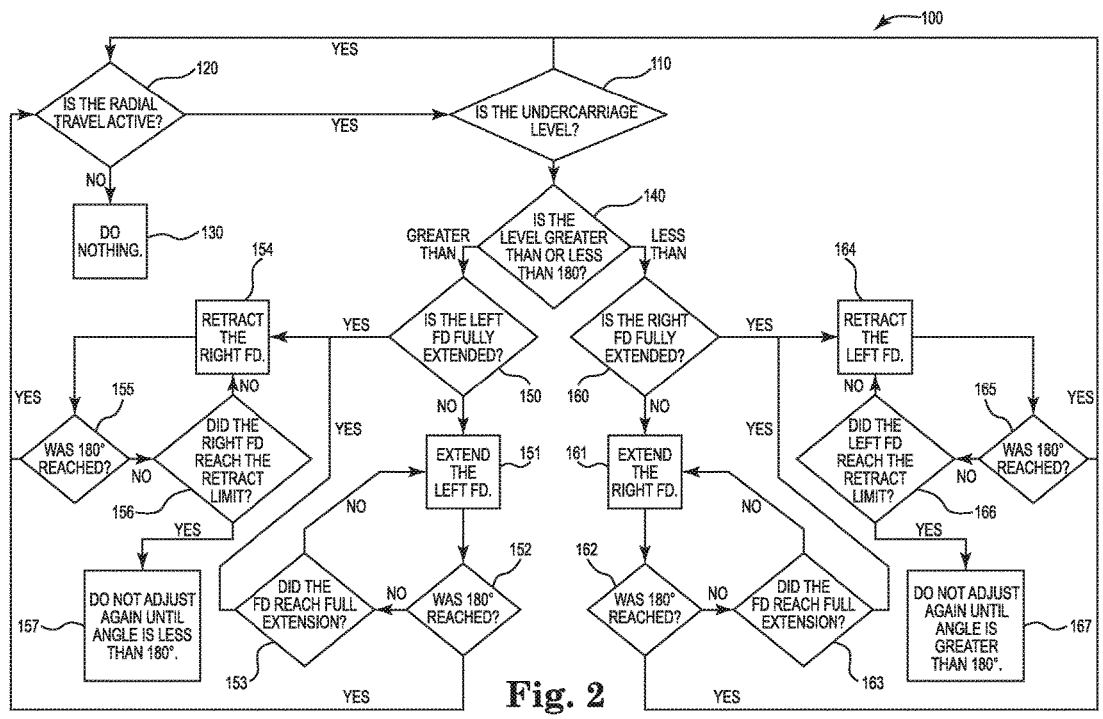
FIG. 2 is a flow chart corresponding to one embodiment of a conveyor leveling method.

FIG. 2 illustrates one embodiment of sequence 100 by which the controller (PLC) adjusts the base frame 40 toward a level orientation as it traverses uneven terrain (e.g., either above or below the surrounding level terrain). Initially, at 110, the controller uses a level sensor input to determine whether the base frame is level. If so, the controller checks at 120 for whether the base frame is travelling radially, as the controller performs additional tasks if that is the case. Alternatively, the controller begins sensing level when it detects radial travel of the base frame. The controller may determine whether the base frame is travelling radially by determining whether the controller is commanding a radial movement (e.g., whether a command has been entered to command radial movement), or in other embodiments by using a wheel speed encoder or a kinematic sensor such as a gyroscope, radar, or GPS receiver. If the base frame is not travelling radially, the controller preferably exits (e.g., terminates and/or restarts the sequence 100) at 130 without adjusting the orientation of the base frame. But if the base frame is travelling radially and is not level (110), the controller at 140 preferably uses the sensor input signal to determine if the angle measurement is greater or less than 180°. In this context, the 0° direction is taken to be a first side of the base frame, e.g., relating to the right FD such that deviation from 180° represents the amount of upward or downward slope being encountered by the opposite, second side of the base frame, e.g., relating to the left FD.

If the angle measurement is greater than 180°, the "left FD" frame of the base frame is encountering a decline or downward slope relative to level. Thus the sequence preferably commands a lowering of the "left FD" frame of the base frame (e.g., to follow downward terrain). The controller preferably determines at 150 whether the "left FD" frame is already fully extended. If the "left FD" frame is not fully extended, then there may be additional extension available to enable the "left FD" frame to be further extended to lower its associated wheel to accommodate the terrain and maintain the entire base frame at level position. Thus if the "left FD" frame is not fully extended, the controller at 151 preferably further extends the "left FD" portion, and if there is sufficient extension available to achieve the 180° level condition again (as indicated by the level sensor), then at 152 the controller preferably stops extending the "left FD" actuator at that level condition, and resumes monitoring for a deviation from that level condition (120, 110). If the "left FD frame has reached full extension and the 180° level has not been reached (153), the controller at 154 preferably retracts the "right FD" actuator, which effectively lowers the related right side of the base frame to accommodate the lowering of the left side caused by the downward slope. The controller monitors at 155 (using the level sensor input) whether the level condition is reached before the "right FD" frame of the base frame reaches its retract limit. If the base frame is not at the 180° level condition when the "right FD" frame reaches its retract limit (156), the controller ensures at 157 that no further retraction of the "right FD" portion is possible until after the entire base frame is at the 180° level condition again, to ensure that the central portion of the base frame has sufficient clearance over the terrain for continued radial travel.

The operations are very similar if the level sensor indicates to the controller that the angle measurement is less than 180°, except that in this case such a measurement indicates that the "left FD" frame of the base frame is encountering an incline or upward slope relative to level. In this case, the controller preferably lowers the "left FD" frame of the base frame to follow the upward terrain, but preferably only after it ensures that the "right FD" actuator is fully extended will it allow the "left FD" portion to be retracted to maintain the base frame at level position. Thus, the controller at 160 will determine if it is possible to further extend the "right FD" actuator, and if there is sufficient extension available (161) to achieve the 180° level condition again (as indicated by the level sensor), the controller (162) will stop extending the "right FD" portion at that level condition, and resume monitoring for a deviation from that level condition (120, 110). If the "right FD" frame has reached full extension (163), the controller at 164 will retract the "left FD" portion, which effectively lowers the left side of the base frame to accommodate the raising of the right side of the base frame (e.g., caused by upward ground slope). The controller monitors at 165 (e.g., using the level sensor input) whether the 180° level condition is reached before the "left FD" portion of the base frame reaches its fully retracted limit. If the base frame is not at the 180° level condition when the "left FD" frame reaches its retract limit (166), the controller ensures at 167 that no further retraction of the "left FD" portion is possible until after the entire base frame is at the 180° level condition again, to ensure that the central portion of the base frame has sufficient clearance over the terrain for continued radial travel.

As described herein, the limit of retraction or extension of an outrigger frame 52a, 52b of the base frame 40 may depend on the retraction or extension limit of the actuator 56 used to raise and/or lower the frame, and may additionally or alternatively depend on the retraction or extension limit of the frame itself. In either case, the retraction or extension limit may be a physical limit at which the frame and/or actuator cannot be physically retracted or extended further, or may comprise another limit (e.g., an empirically determined limit or safety limit) which may be of lower magnitude than a physical limit.

Level Sensor

In one embodiment, an inclination or level sensor may be mounted on the base frame 40 to send the level position to a controller such as a PLC. Based on the level position information coming from the inclination sensor, the PLC program preferably makes a decision on which FD cylinder to raise or lower to bring the base frame back into a level position. Additionally, there may be a proximity sensor located on one or both pivoting outrigger frames 52a, 52b which sends a signal to the PLC to tell the PLC program the actuators 56 maximum and/or minimum travel limits on the stroke of each actuator. Furthermore, there may be yet another sensor (e.g., proximity sensor) mounted on the base frame 40 to detect the ground clearance for the travel wheels, to make sure the conveyor will not get stuck based on the changing conditions of the terrain the radial wheels will drive on, e.g., ruts formed by the other wheels, weathering of the terrain, and so on. In alternative embodiments, the angle of level correction may be greater or less than about 3 degrees or 5.25% grade. The level sensor may be mounted to the central base frame portion 42 of the base frame and/or to the support 46. The level sensor is mounted to a portion of the conveyor (e.g., the base frame) that moves rigidly with the conveyor truss (e.g., when the conveyor truss is not being raised or lowered, extended or retracted, such as during material transfer operations of the conveyor). In alternative embodiments, the level sensor may be mounted to other locations on the base frame or elsewhere on conveyor, e.g., to a truss of the conveyor. In embodiments in which the level sensor is disposed remotely from the base frame, the level sensor may be in wireless communication with the controller.

In embodiments including a proximity sensor (e.g., mounted to the base frame such as on the central base frame 42, and disposed to measure a distance between the base frame and/or the transport wheels and the ground surface), the proximity sensor may be used additionally or alternatively to determine an adjustment to make to the actuators 56.

Hydraulics

To implement a base frame leveling system, in one embodiment a hydraulic system may incorporate automatic leveling without affecting the other hydraulic functions on the bulk material conveyor transport system. In one embodiment, the hydraulic system controls the hydraulic fluid (e.g., oil) flow to each hydraulic cylinder based on commands from the PLC program. Existing systems for raising and lowering may be sized to operate one function at a time (with the possible exception of raising both cylinders during a raise cycle). If so, to operate the auto-leveling system described here, in one embodiment the single flow source is split to allow the cylinders to operate while the radial travel wheels are also in operation. In one embodiment, the reaction time of the cylinders is reduced to provide stability to the truss in the raised position, but also to prevent overreaction during levelling adjustments.

In one embodiment two hydraulic pumps on the main hydraulic power unit (e.g., a tandem gear pump) are utilized to achieve the desired speed for these two control functions. In this embodiment, the cylinder control valves are also isolated from the rest of the control valves such that the cylinder control valves have an isolated and reduced flow rate during leveling operations. This may be achieved in any known manner, but most preferably is achieved by having two independent pumps connected with two independent valve manifolds. In some embodiments in which a pump is sized for the flow rate to be provided for the actuators, there may be no need for flow controls to alter the flow rate. Elimination of flow controls could eliminate unnecessary heat in the system due to alteration of flow.

In yet another embodiment, in order for the cylinders to operate at normal speed when making a raise cycle, there is an additional 2 position (bypass) valve controlled by the PLC that will open both pump flows to either valve manifold as needed. In one non-limiting example, such a bypass valve allows the cylinders to operate between a use of 1.2 GPM during leveling operations and as much as 9 GPM for faster cycle time during the raise cycle as well as regular manual control operation. Each valve manifold has the ability to use the maximum flow rate if desired, as that may be controlled by the 2 position bypass valve and one of the two dump valves on each valve bank manifold. This mode of operation also can be managed through the PLC program.

Figure 3:
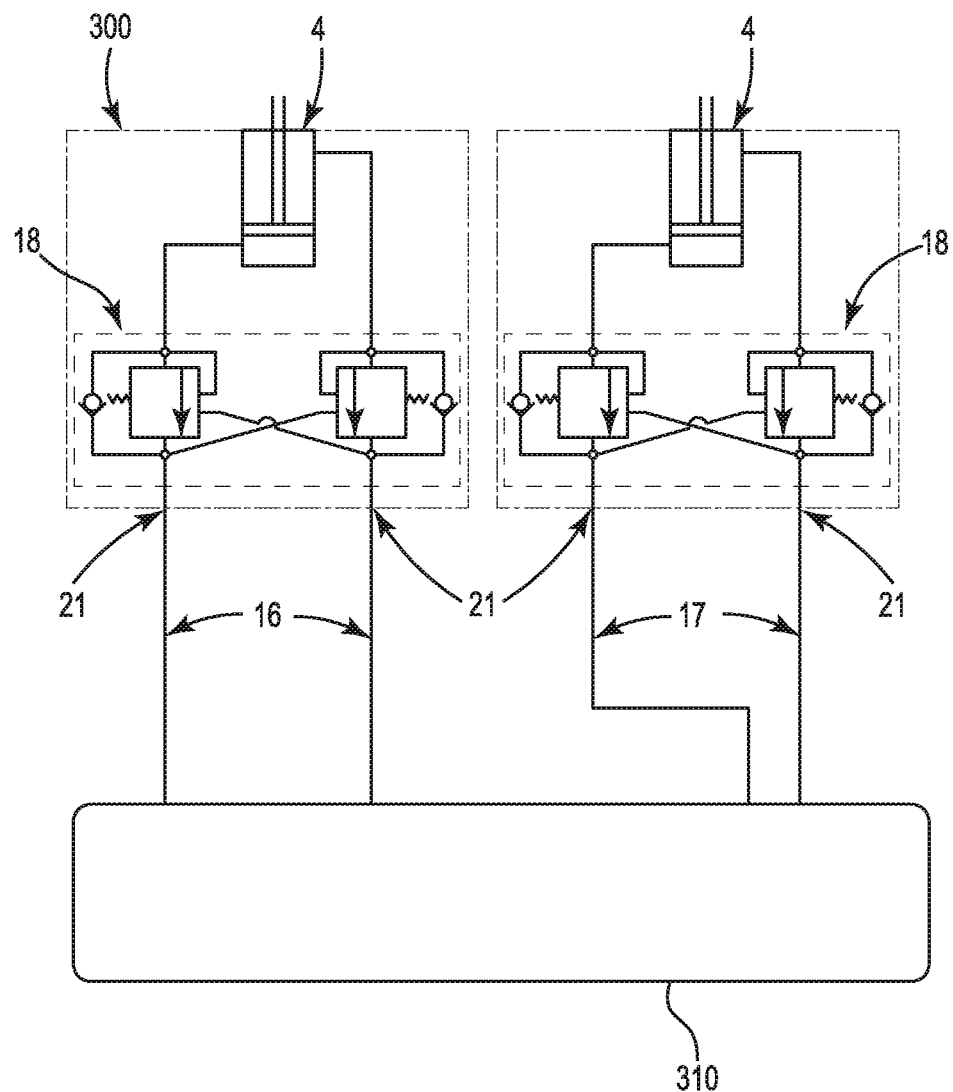
FIG. 3 is a partial hydraulic piping schematic of one embodiment of a conveyor leveling system.

As shown in the hydraulics schematic of FIG. 3, each of two double-acting actuators 4 (e.g., hydraulic FD cylinders) is attached by conventional fittings 21 and hoses 16, 17 to a conventional source 300 of hydraulic pressure and control. Each actuator 4 is controlled by a valve 18 such an overcenter valve. One example of a PLC is the Allen Bradley MicroLogix 1400 available from Rockwell Automation. One example of a level sensor (e.g., inclination sensor) is the P&F model INX360D-F99-I2E2-V15 available from Pepperl & Fuchs in Mannheim, Germany. In various embodiments, the level sensor may comprise a tilt sensor and/or gyroscope. If used, one example of a proximity sensor is the P&F model NEB12-18GM50-E2-V1 available from Pepperl & Fuchs in Mannheim, Germany. Additional details of the operation of these components is provided herein.

In embodiments employing two pumps as described above, a first pump preferably has a displacement of 1.03 cubic inches of displacement ("CID"), which may produce approximately 7.75 gallons per minute ("GPM") output. A second pump preferably uses a second pump portion having a displacement of 0.16 CID which only produces approximately 1.2 GPM output.

Limit Sensor

To limit the travel of the actuators 46 during leveling operations, it is desirable to incorporate a proximity sensor (e.g., induction sensor) on each side of the outrigger frame 52a, 52b to sense a "lug" or other feature mounted to an adjustable bracket on the FD arm assembly. This allows for precise set-up for maximum operating angle adjustment, i.e., to ensure that travel of the cylinders is limited. For example, in one alternative embodiment, as confirmed by testing the use of a magnetic piston in the FD cylinder and external magnetic field sensors (Pepperl & Fuchs model MB-F32-A2-V1), such equipment proved effective. If proximity sensors are omitted, a software-based limit on the travel of the cylinders may be used in the alternative, if desired.

Speed Control

It is preferred to control the speed (e.g., flow rate) of the actuators 56 in the normal operating condition. This is because rapid changes in angle can cause overcorrection by the control logic. One method to overcome this problem is to reduce the flow rate to the FD cylinders in any convenient manner. While a single gear pump or pressure-compensator-controlled piston pump could be used, a tandem gear pump also can be used. Such an embodiment may benefit from use of a 15 horsepower motor instead of a 10 horsepower motor. A major advantage of the tandem fixed gear pump design is that the pump provides a consistent flow rate in varying climates and environments. Alternative methods of using special pump controls and in-line flow controls may rely on consistent adjustment settings during the installation. In some embodiments, a pressure compensating pump control and/or flow controls may be used to adjust speed, which controls may consume energy and emit heat. Flow controls may be used in some embodiments to control radial travel and may also create additional heat. In some embodiments an oil cooler may be used prevent oil from reaching excessive temperatures.

In another embodiment, a single valve manifold is used, which may reduce the size required as compared to two individual manifolds. One exemplary manifold is designed with two pressure inlets and a single common tank outlet. The tandem pump preferably provides two independent flow rates to each manifold inlet, which are internally separated by a two position (on-off) valve cartridge that will either combine the flows of both pumps to all the valve stations, or split the circuit into individual circuits and provide normal flow rates to the radial travel wheel circuit (and other hydraulic circuits) while at the same time allowing for a reduced flow rate to either levelling actuator (e.g., FD cylinder).

It should be noted that when in set-up mode, the two position (on/off) cartridge is preferably actuated and opens the path for the flows from both pumps to combine and provide the maximum flow rate to the FD cylinders.

Automation Controls

Automation controls allow an operator to turn the leveling (e.g., automatic leveling) function on or off through the set up touch screen. This means that whether the operator is running an automated pile program or manual control, the leveling function can be turned on or off. When the leveling function is active, the PLC preferably reads and evaluates the signal from the inclination sensor 420 (e.g., located on the base frame). The PLC program logic preferably uses this feedback to control valves in fluid communication with each chamber of each leveling actuator (e.g., the rod end and head end of each actuator) to continuously adjust the FD cylinder position and maintain a level base frame.

System Embodiments

Figure 4:
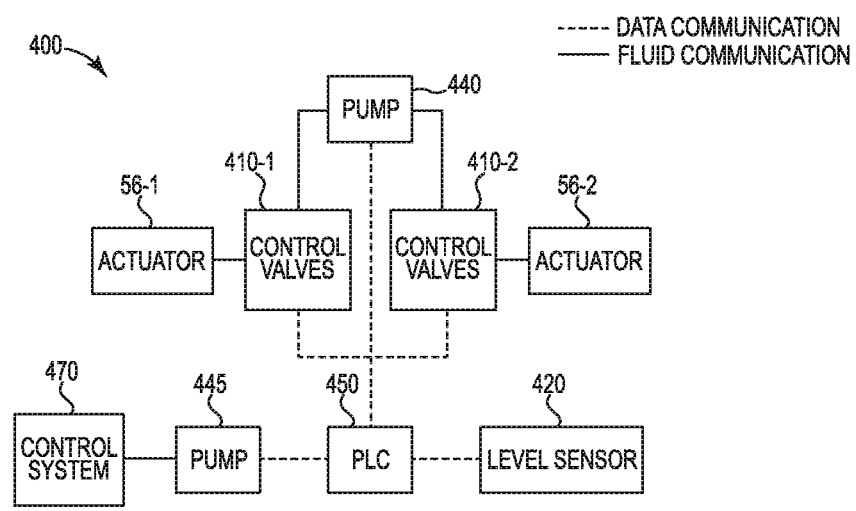
FIG. 4 is a system schematic of the conveyor leveling system of FIG. 3.

An exemplary system 400 for leveling a conveyor (e.g., according to various methods described herein) is illustrated schematically in FIG. 4, in which solid lines indicate fluid communication between components (e.g., for transfer of pressurized hydraulic oil) and dotted lines indicate data communication (e.g., electrical, electronic, wireless) between components (e.g., for transfer of signals and other commands). A first pump 440 (e.g., a gear pump such as a tandem pump) supplies fluid (e.g., hydraulic oil) to actuators 56-1, 56-2 (e.g., FD cylinders). In some embodiments, control valves 410-1, 410-2 (e.g., flow control valves) control a flow rate and/or pressure of fluid supplied to the actuators 56-1, 56-2, respectively. The control valves 410-1, 410-2 and/or pump 440 are in data communication with and controlled by a programmable logic controller (PLC) 450. A level sensor 420 is in data communication with the PLC 450 for sending level signals to the PLC 450.

In some embodiments, a second pump 445 is in fluid communication with a control system 470 having control valves for controlling other hydraulic features of the conveyor (e.g., cylinders for raising and lowering the conveyor and/or motors for controlling radial travel of the conveyor). The second pump 445 may be in data communication with the PLC 450 or with another controller.

Example

FIGS. 5A and 5B and FIGS. 6A and 6B are a pair of annotated pictures comparing performance of one embodiment in two separate runs of identical performance conditions, except for the operation of the leveling system. FIGS. 5A, 5B, 6A, 6B demonstrate a base frame assembly passing over a mound of unevenly piled earth 510 causing the base frame assembly to deviate from the level ground 520 surrounding the mound of earth. The amount of deviation from level as illustrated by line 600 depends on the position of the radial travel wheels 530, 540 on the mound, and may not be the same on one side of the mound as compared to the other, i.e., the mound may not be symmetric with respect to the midpoint or crest of the mound.

Figure 5A:
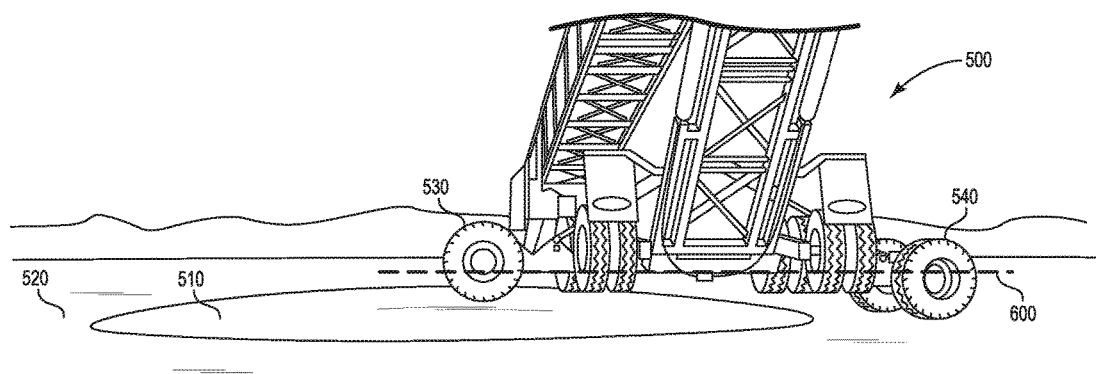
FIGS. 5A and 5B are a pair of annotated images comparing performance of one embodiment of the conveyor leveling system as applied to a base frame assembly passing over the crest of a mound of earth.

An automatic system as described above was assembled at full scale and tested to demonstrate its principles of operation and effectiveness. FIGS. 5A and 6A, reflect a run in which the automatic leveling system is turned on, and FIGS. 5B and 6B reflect a run in which the auto-leveling system was turned off. The images of FIG. 5A show base frame 500 passing from right to left over the mound 510, i.e., the "leading" wheels 530 on the mound 510 and the "lagging" wheels 540 still on level ground 520. The images of FIG. 5B show the base frame 500 centered over the mound 510 moving from left to right, i.e., both wheels 530, 540 on a portion of the mound 510 as opposed to level ground 520.

Figure 5B:
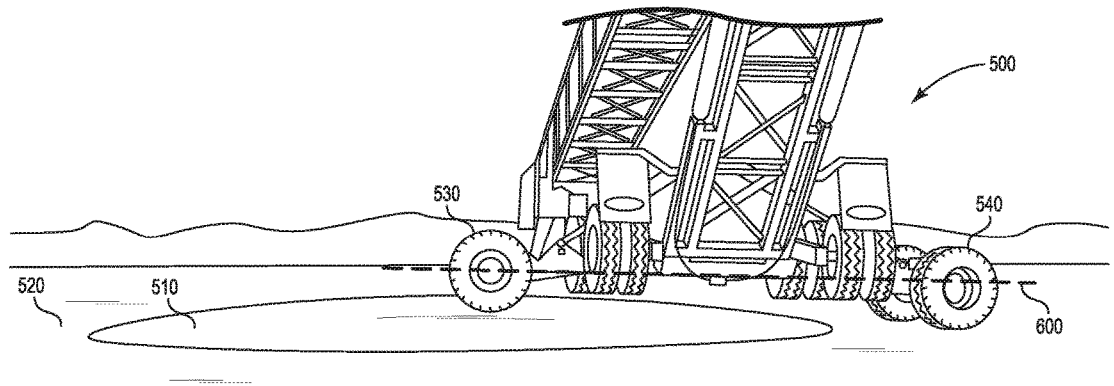
Figure 6A:
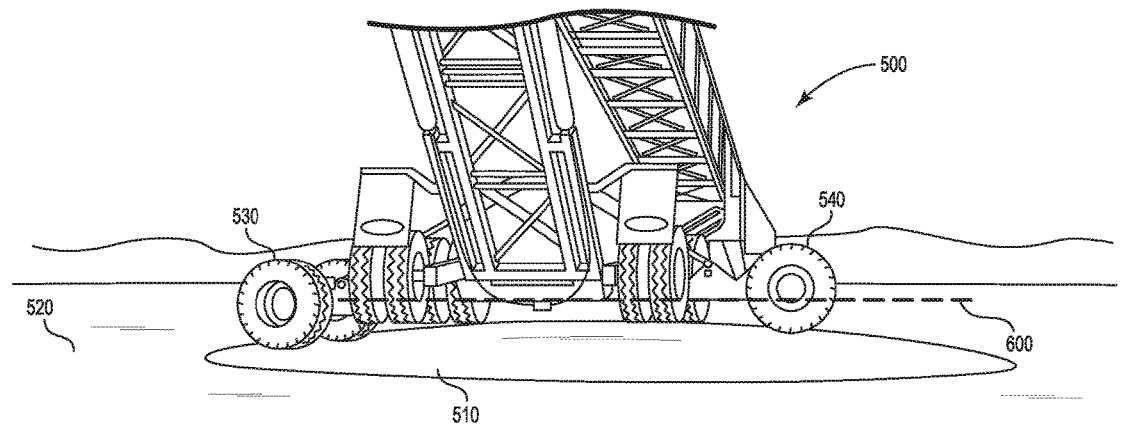
FIGS. 6A and 6B are a pair of annotated images comparing performance of one embodiment of the conveyor leveling system as applied to a base frame assembly passing over the crest of a mound of earth.
Figure 6B:
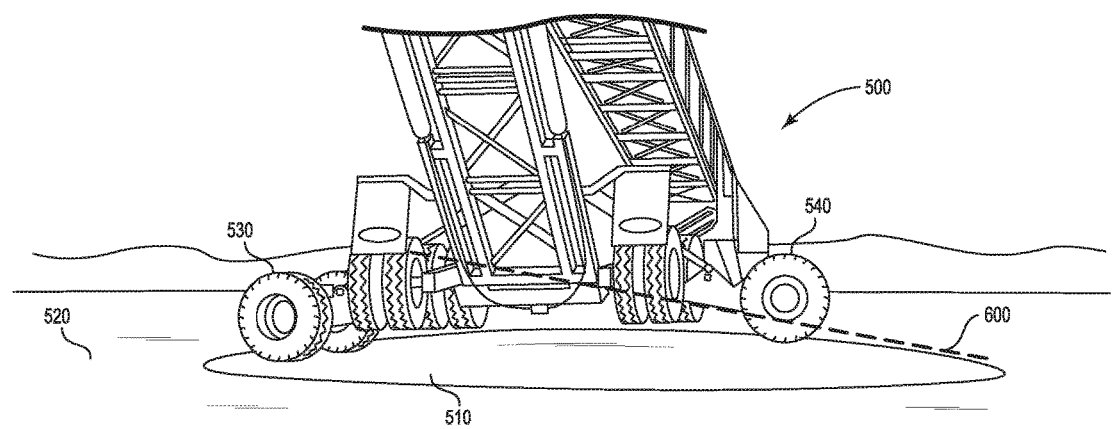

In FIGS. 5A, 5B, 6A, 6B a dashed reference line 600 is drawn between points on the base frame 500 to illustrate the difference in position of the base frame 500 as a whole (or, in other embodiments, only portions of the base frame 500 which are controlled by the leveling system) due to the leveling system being either on (upper image) or off (lower image). In FIGS. 5A, 5B, the base frame 500 is at the same location relative to the mound 510, and thus all conditions affecting the overall degree of level of the base frame 500 are essentially the same except for the use (upper image) or lack of use (lower image) of the leveling system. FIGS. 6A and 6B also show base frame 500 at the same location relative to mound 510. By comparing the lines 600 it may be observed that the leveling system has a substantial impact on the degree to which the base frame 500 remains level despite passing over the uneven terrain caused by the mound of earth 510. For example, note the difference in angle of the lines 600 at the leading wheel assembly, i.e., the leftmost assembly in FIGS. 5A-5B (supporting wheels 530) and the rightmost assembly in FIGS. 6A-6B (supporting wheels 540).

Further Embodiments

In some embodiments, an additional actuator or actuators is/are used to level the conveyor. In such embodiments, actuators for raising or lowering radial travel wheels to a transport position may not be used for leveling the conveyor. Some embodiments may not include actuators for raising or lowing radial travel wheels to a transport position.

In some exemplary embodiments in which an actuator or actuators other than the FD actuators are used to level the conveyor, a leveling actuator may be disposed to adjust the orientation, position and/or configuration of the base frame (e.g., of the support 46). For example, the support 46 may be slidingly or pivotally mounted to the central base frame 42 and one or more leveling actuators may be employed to modify a height and/or orientation of the support 46.

It should be appreciated that although certain methods described herein preferably determine whether the conveyor (e.g., base frame) is moving radially, such methods do not necessarily include determining the direction of radial movement, nor do systems performing such methods necessarily include devices or structure for determining such direction. However, some embodiments may additionally or alternatively determine a direction of travel (e.g., radial travel) of the conveyor (e.g., base frame) in order to determine an appropriate leveling action (e.g., extension or retraction of an actuator such as an FD actuator).

Although the base frame embodiments illustrated herein are shown supported by wheels, in other embodiments, the base frame may be supported by other apparatus such as tracks for radial travel (and/or transport). In still other embodiments, the base frame may not travel radially during operations and/or may be a stationary conveyor without wheels and/or tracks.

Based on the description above, a method and system for leveling a conveyor has been described. One embodiment involves a method of leveling a radial stacking conveyor. This type of conveyor has radial travel wheels connected on generally opposing sides of a base frame that are height adjustable by actuators. A first actuator is associated with a first set of radial travel wheels on a first side of the base frame, and a second actuator is associated with a second set of radial travel wheels connected on a second side of the base frame. The first and second actuators are able to adjust a vertical spacing between the radial travel wheels and the base frame, the method of leveling comprises providing a level sensor on the conveyor; sensing a signal from the level sensor indicating that the base frame is not level; performing a first adjustment step comprising raising a low side of the base frame; sensing the signal from the level sensor to determine if the first adjustment step leveled the base frame; and performing a second adjustment step if the first adjustment step did not level the base frame, the second adjustment step comprising lowering a high side of the base frame towards level.

Another embodiment is a leveling system for a radial stacking conveyor having height adjustable radial travel wheels connected on generally opposing sides of a base frame. The base frame comprises a first actuator associated with a first set of radial travel wheels on a first side of the base frame, and a second actuator associated with a second set of radial travel wheels connected on a second side of the base frame. Each of the first and second actuators is in fluid communication with a valve that controls an extension of the respective first and second actuators. The first and second actuators are able to extend and retract to adjust a vertical spacing between the radial travel wheels and the base frame. The leveling system further comprises a level sensor mounted to the conveyor that is able to generate a level sensor signal indicating that the orientation of the conveyor relative to level, and a controller that is in data communication with the level sensor and the valves of the first and second actuators. The controller is capable of performing a first leveling sequence to level the base frame comprising detecting when one side of the base frame is below level; extending one of the first and second actuators on a low side of the base frame until the level sensor signal indicates the conveyor is level or until the actuator on the low side of the base frame is extended by a threshold distance. The controller is further capable of performing a second leveling sequence if the first leveling sequence does not level the base frame comprising retracting one of the first and second actuators on a high side of the base frame to lower the high side towards level.

We claim:

1. A method of leveling a radial stacking conveyor having a base frame, the base frame carrying a first set of radial travel wheels connected on a first side of the base frame and a second set of radial travel wheels connected on a second side of the base frame, the base frame comprising a first actuator associated with the first set of radial travel wheels, and a second actuator associated with the second set of radial travel wheels, the first and second actuators able to move the first and second set of radial travel wheels from a first position above a ground surface to a second position in contact with the ground surface to allow radial travel of the radial stacking conveyor, the method comprising:

providing a level sensor on the conveyor;
sensing a signal from the level sensor;
performing a first adjustment step comprising raising or lowering a first side of the base frame, wherein the first adjustment step comprises modifying an extension of the first actuator to vary a first spacing of the first set of radial travel wheels relative to the base frame such that the first spacing of the first set of radial travel wheels is different than a second spacing of the second set of radial travel wheels relative to the base frame;
sensing the signal from the level sensor to determine if the first adjustment step leveled the base frame; and
performing a second adjustment step if the first adjustment step did not level the base frame, wherein the second adjustment step comprises modifying an extension of the second actuator to vary the second spacing of the second set of radial travel wheels relative to the base frame.

2. The method of claim 1, wherein said level sensor comprises an inclination sensor disposed to measure an inclination of the conveyor along an X direction, the X direction being tangential to a radial travel direction R of the conveyor.

3. The method of claim 1, wherein the level sensor is mounted to the base frame.

4. The method of claim 1, further comprising:
moving the base frame along a radial path on said first and second sets of radial travel wheels.

5. The method of claim 1, further comprising:
lowering said first and second sets of radial travel wheels to a radial travel position; and
with said first and second sets of radial travel wheels in said radial travel position, moving the base frame along a radial path on said first and second sets of radial travel wheels.

6. The method of claim 1, further comprising:
raising said first and second sets of radial travel wheels to a transport position, wherein when said first and second sets of radial travel wheels are in said transport position, the base frame is at least partially supported by at least one transport travel wheel.

7. The method of claim 4, further comprising:
raising said first and second radial travel wheels to a transport position, wherein when said first and second sets of radial travel wheels are in said transport position, the base frame is supported by a transport wheel.

8. The method of claim 1, further comprising:
powering a primary hydraulic conveyor function with a first hydraulic pump; and
powering extension of said first actuator with a second hydraulic pump.

9. The method of claim 8, wherein said primary hydraulic conveyor function comprises one of raising and lowering a conveyor truss relative to the base frame and moving the base frame along a radial travel path.

10. The method of claim 8, wherein said first and second hydraulic pump together comprise a tandem gear pump.

11. The method of claim 1, further comprising:
comparing an extension of the set of radial travel wheels on the low side of the base frame to a threshold extension.

12. The method of claim 11, further comprising:
determining said extension using a proximity sensor.

13. A leveling system for a radial stacking conveyor having radial travel wheels connected on generally opposing sides of a base frame, the base frame comprising a first actuator associated with a first set of radial travel wheels on a first side of the base frame, and a second actuator associated with a second set of radial travel wheels connected on a second side of the base frame, the first and second actuators able to extend and retract to adjust a vertical spacing between the radial travel wheels and the base, the leveling system comprising:
- a level sensor mounted to the conveyor, the level sensor configured to generate a level sensor signal indicating the orientation of the conveyor relative to level;
- a first valve in fluid communication with the first actuator, the first valve configured to control an extension of the first actuator;
- a second valve in fluid communication with the second actuator, the second valve configured to control an extension of the second actuator; and
- a controller in data communication with the level sensor and the first and second valves, the controller capable of performing a first leveling sequence to level the base frame, the first leveling sequence comprising detecting when one side of the base frame is below level; extending or retracting the first actuator in order to modify a first spacing between the first set of radial travel wheels and the base frame such that the first spacing is different than a second spacing between the second set of radial travel wheels and the base frame, wherein the controller is capable of performing a second leveling sequence if the first leveling sequence does not level the base frame, the second leveling sequence comprising extending or retracting the second actuator in order to modify the second spacing between the second set of radial travel wheels and the base frame.

14. The leveling system of claim 13, further comprising:
a proximity sensor, said proximity sensor being in data communication with said controller, wherein said proximity sensor is configured to generate a proximity signal, said proximity signal being indicative of an extension of the first set of radial travel wheels.

15. The leveling system of claim 14, wherein said proximity signal is indicative of the extension of the first actuator.

16. The leveling system of claim 15, wherein the proximity sensor is mounted adjacent to said first actuator.

17. The leveling system of claim 13, further comprising:
- a first hydraulic pump, said first hydraulic pump in fluid communication with said first actuator;
- a conveyor lift cylinder disposed to modify a height of a conveyor truss; and
- a second hydraulic pump, said second hydraulic pump in fluid communication with said conveyor lift cylinder.

18. The leveling system of claim 17, wherein said first and second hydraulic pumps together comprise a tandem gear pump.

19. The leveling system of claim 13, wherein the base frame has a transport configuration and a radial travel configuration, wherein in said radial travel configuration the base frame is supported by said first and second sets of radial travel wheels, wherein the first and second actuators are able to alternately raise and lower the first and second sets of radial travel wheels between the transport configuration and the radial travel configuration, the leveling system further comprising:
a transport wheel, wherein in said transport configuration the base frame is at least partially supported by said transport wheel.

20. The leveling system of claim 13, wherein said level sensor comprises an inclination sensor disposed to measure an inclination of the conveyor along an X direction, the X direction being tangential to a radial travel direction R of the conveyor.

* * * * *